UNITED STATES PATENT OFFICE.

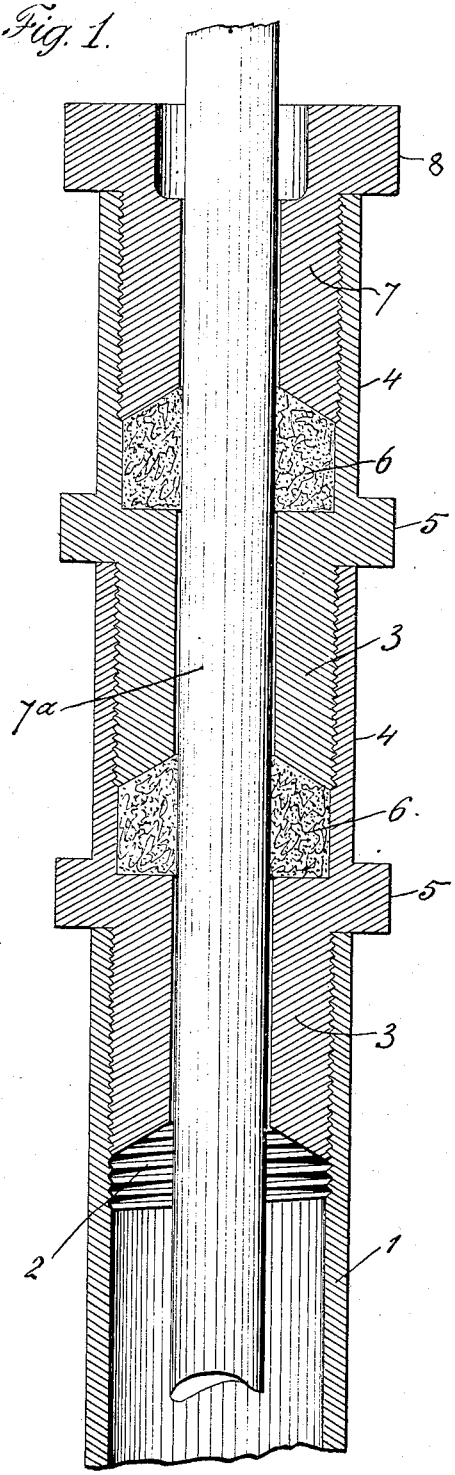
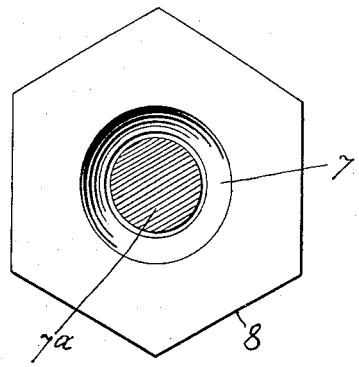
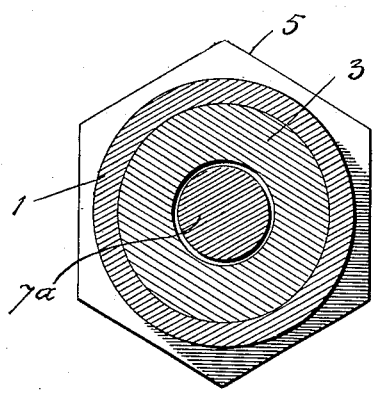

ERNEST J. SALT, OF DARLINGTON, AND CHARLES L. HERB, OF MILLVALE, PENNSYLVANIA.

STUFFING-BOX.

No. 884,864.     Specification of Letters Patent.     Patented April 14, 1908.

Application filed January 18, 1908. Serial No. 411,488.

*To all whom it may concern:*

Be it known that we, ERNEST J. SALT, residing at Darlington, in the county of Beaver, and CHARLES L. HERB, residing at Millvale, in the county of Allegheny, State of Pennsylvania, citizens of the United States, have invented certain new and useful Improvements in Stuffing-Boxes, of which the following is a specification, reference being had therein to the accompanying drawing.

This invention relates to stuffing boxes, and the primary object of the invention is to provide a novel stuffing box in which two separate and distinct packings are employed, to insure a non-leakable connection between the stuffing box and the rod or shaft that passes through the same.

To this end, we have designed a stuffing box particularly for oil well tubings, the stuffing box being threaded in the tubings, to surround the pump rod extending into the tubing. The stuffing box is made of a plurality of connected casings and glands, with packing interposed.

The detail construction entering into our invention will be presently described in detail, and then specifically pointed out in the appended claims.

In the drawings: Figure 1 is a vertical sectional view of the stuffing box constructed in accordance with our invention, Fig. 2 is a plan of the same, and Fig. 3 is a cross sectional view of the stuffing box.

In the accompanying drawing, 1 designates the upper end of a well tubing, this tubing being interiorly threaded, as at 2, to receive the depending threaded end or gland 3 of a casing 4. This casing approximately intermediate its ends is formed with angular faces 5, whereby the casing can be easily rotated by a wrench (not shown). The casing 4 is interiorly screw threaded and is adapted to contain packing 6, the packing surrounding a pump rod 7ª, extending downwardly into the tubing 1.

Adapted to screw into the casing 4 and force the packing 6 into engagement with the rod 7ª, is the depending end 3 of another casing 4, this casing being identical in construction to the one previously described. It is apparent that quite a number of casings 4 can be used, but in the present instance, I close the uppermost casing by a gland 7 having angular surfaces for a nut 8.

It will be apparent from the foregoing description that I combine a gland with a packing casing, and arrange said casings in such a manner that the integral gland of a casing will serve functionally as a gland for an adjoining casing.

The stuffing box in its entirety is constructed of strong and durable metal and can be used in connection with piston rods, pump rods and such movable bodies that are to be packed.

Having now described our invention what we claim as new, is:—

The combination with a well provided with interior threads tubing and a pump rod, of a casing detachably mounted upon the upper end of said tubing, surrounding said rod and formed of two different diameters, that portion of smaller diameter extending in and formed with peripheral threads engaging the threads of the tubing and surrounding the rod and that portion of larger diameter constituting a chamber, that portion of smaller diameter having its lower end beveled a packing located in said chamber, the wall of said chamber being screw threaded, an upper casing mounted upon and extending in said first-mentioned casing, said upper casing formed of two different diameters, that portion of smaller diameter surrounding said pump rod and that portion of larger diameter constituting a chamber, a packing mounted in the chamber formed in the upper casing, the wall of said chamber in the upper face being screw threaded, that portion of smaller diameter provided with peripheral threads engaging with the threads formed on the inner face of said first mentioned chamber and further having its lower end beveled and a packing gland extending within the chamber of the upper casing and secured to said casing, said packing gland at its top and each of said casings provided with an annular shoulder intermediate its ends whereby the lower casing will engage the top edge of the tubing, the upper casing engaging the top edge of the lower casing and the packing gland the top edge of the upper casing.

In testimony whereof we affix our signatures in the presence of two witnesses.

ERNEST J. SALT.
                 CHARLES L. HERB.

Witnesses:
    MAX H. SROLOVITZ,
    WM. KOSCH.